(12) United States Patent
Podgorny et al.

(10) Patent No.: US 8,806,444 B1
(45) Date of Patent: Aug. 12, 2014

(54) MODIFYING SOFTWARE BASED ON TRACKED ACTIVITIES

(75) Inventors: Igor A. Podgorny, San Diego, CA (US);
Moshe Olim, San Diego, CA (US);
Marc J. Attinasi, Ramona, CA (US);
Troy D. Otillio, Carlsbad, CA (US)

(73) Assignee: Intuit Inc., Mountain View, CA (US)

( * ) Notice: Subject to any disclaimer, the term of this patent is extended or adjusted under 35 U.S.C. 154(b) by 265 days.

(21) Appl. No.: 13/081,772

(22) Filed: Apr. 7, 2011

(51) Int. Cl.
*G06F 9/44* (2006.01)

(52) U.S. Cl.
USPC ........... 717/127; 717/120; 717/121; 717/126; 717/128

(58) Field of Classification Search
None
See application file for complete search history.

(56) References Cited

U.S. PATENT DOCUMENTS

| | | | |
|---|---|---|---|
| 5,600,778 A * | 2/1997 | Swanson et al. | 715/762 |
| 6,021,403 A * | 2/2000 | Horvitz et al. | 706/45 |
| 6,233,570 B1 * | 5/2001 | Horvitz et al. | 706/11 |
| 6,262,730 B1 * | 7/2001 | Horvitz et al. | 715/707 |
| 7,263,663 B2 * | 8/2007 | Ballard et al. | 715/762 |
| 7,603,657 B2 * | 10/2009 | Gassner et al. | 717/113 |
| 7,793,260 B2 * | 9/2010 | Fields et al. | 717/121 |
| 2007/0180386 A1 * | 8/2007 | Ballard et al. | 715/744 |
| 2007/0180432 A1 * | 8/2007 | Gassner et al. | 717/136 |

\* cited by examiner

*Primary Examiner* — Isaac Tecklu
(74) *Attorney, Agent, or Firm* — Park, Vaughan, Fleming & Dowler LLP; Steven E. Stupp

(57) ABSTRACT

Activities of a user are tracked while a user uses a software application. Based on the tracked user activities, a user-experience metric is determined for the user, where the user-experience metric reflects a need to modify a user experience associated with the software application. In response to the determined user-experience metric, the user experience is modified. For example, modifying the user experience may include: providing help content to the user, changing a user interface associated with the software application, and/or contacting the user.

19 Claims, 6 Drawing Sheets

US 8,806,444 B1

MODIFYING SOFTWARE BASED ON TRACKED ACTIVITIES

CROSS REFERENCE TO RELATED APPLICATION

This application is related to U.S. Non-provisional patent application Ser. No. 12/841,831, entitled "Real-Time User-Behavior Prediction," by Igor A. Podgorny, Fedor N. Dzegilenko, Floyd J. Morgan, Vineet Singh, Marc J. Attinasi and Troy D. Otillio, filed on Jul. 22, 2010, to U.S. Non-provisional patent application Ser. No. 12/841,838, entitled "Real-Time Tracking of User-Application Interaction," by Marc J. Attinasi, Igor A. Podgorny, Fedor N. Dzegilenko, Floyd J. Morgan, Vineet Singh and Troy D. Otillio, filed on Jul. 22, 2010, and to U.S. Non-provisional Patent Application Serial Number not yet assigned, entitled "Modifying Customer Support Based on Tracked Activities," by Igor A. Podgorny, Moshe Olim, Marc J. Attinasi, and Troy D. Otillio, filed on Apr. 7, 2011, the contents of which are herein incorporated by reference.

BACKGROUND

The present disclosure relates to techniques for modifying a user experience associated with a software application based on tracked user actions while the user accesses the software application.

To assist customers in using software applications efficiently and effectively, many suppliers of software applications provide customer-support services, such as a call center that answers customer questions. However, it can be difficult to properly manage a call center. For example, if the call centers are not properly staffed, excessive wait times can result, with a commensurate negative impact on customer satisfaction.

Furthermore, call centers often involve significant operating costs, such as those associated with paying the call-center staff. These operating costs can be difficult to manage because of: varying demand for customer support (especially for software applications that have large seasonal variations in usage, such as income-tax preparation software), the difficulty in forecasting future call-center demand (such as the number of telephone calls or chat sessions per a given time interval, as well as the average service times), and the long lead time when ramping up or ramping down staffing in a call center.

SUMMARY

The disclosed embodiments relate to a computer system that modifies a user experience associated with a software application. During operation, the computer system tracks activities of a user while using the software application. For example, the tracked activities may include: user-interface operations performed by the user in a given portion of the software application; switching between portions of the software application; and/or monitoring information provided by the user to an online forum associated with the software application. In the latter example, the computer system may extract content from the monitored information.

Then, the computer system determines a user-experience metric for the user based on the tracked activities, where the user-experience metric reflects a need to modify the user experience associated with the software application. Determining the user-experience metric may involve calculating a uniqueness metric for user-interface operations and a relative time spent per portion of the software application, where the support confidence metric corresponds to the uniqueness metric for user-interface operations and the relative time spent per portion of the software application (for example, the support confidence metric may be a function of the uniqueness metric for user-interface operations and the relative time spent per portion of the software application). Furthermore, the confidence metric may further correspond to an estimated emotional state of the user.

In some embodiments, the uniqueness metric for user-interface operations has a different value for user-interface operations performed in a portion of the software application that was not previously viewed during a user session. Moreover, the relative time spent per portion of the software application may have a different value if a time spent by the user in a portion of the software application equals an average time spent per portion of the software application.

In response to the determined user-experience metric, the computer system modifies the user experience. For example, the modification may include: providing help content to the user, changing a user interface associated with the software application, and/or contacting the user. Note that modifying the user experience may reduce the probability that the user will contact customer support associated with the software application.

In some embodiments, prior to modifying the user experience, the computer system compares the user-experience metric to a threshold value. This threshold value may be dynamically changed based at least on a time of year or available resources.

Another embodiment provides a method that includes at least some of the operations performed by the computer system.

Another embodiment provides a computer-program product for use with the computer system. This computer-program product includes instructions for at least some of the operations performed by the computer system.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of a computer system, a technique for modifying a user experience associated with a software application, and a computer-program product (e.g., software) for use with the computer system are described. During the modification technique, activities of a user are tracked while the user uses a software application. Based on the tracked user activities, a user-experience metric for the user is determined, where the user-experience metric reflects a need to modify the user experience. Moreover, in response to the determined user-experience metric, the user experience is modified. For example, modifying the user experience may include: providing help content to the user, changing a user interface associated with the software application, and/or contacting the user.

By facilitating modification of the user experience, the modification technique may: improve the user experience when using the software application and/or reduce a need for the user to contact customer support. Consequently, the modification technique may reduce the cost of supporting the software application, and may increase customer satisfaction and retention, thereby increasing the market share and profitability of the provider of the software application.

In the discussion that follows, a user may include one of a variety of entities, such as: an individual (for example, an existing customer, a new customer, a service provider, a vendor, a contractor, etc.), an organization, a business and/or a government agency. Furthermore, a 'business' should be understood to include: for-profit corporations, non-profit corporations, organizations, groups of individuals, sole proprietorships, government agencies, partnerships, etc.

Figure 1:
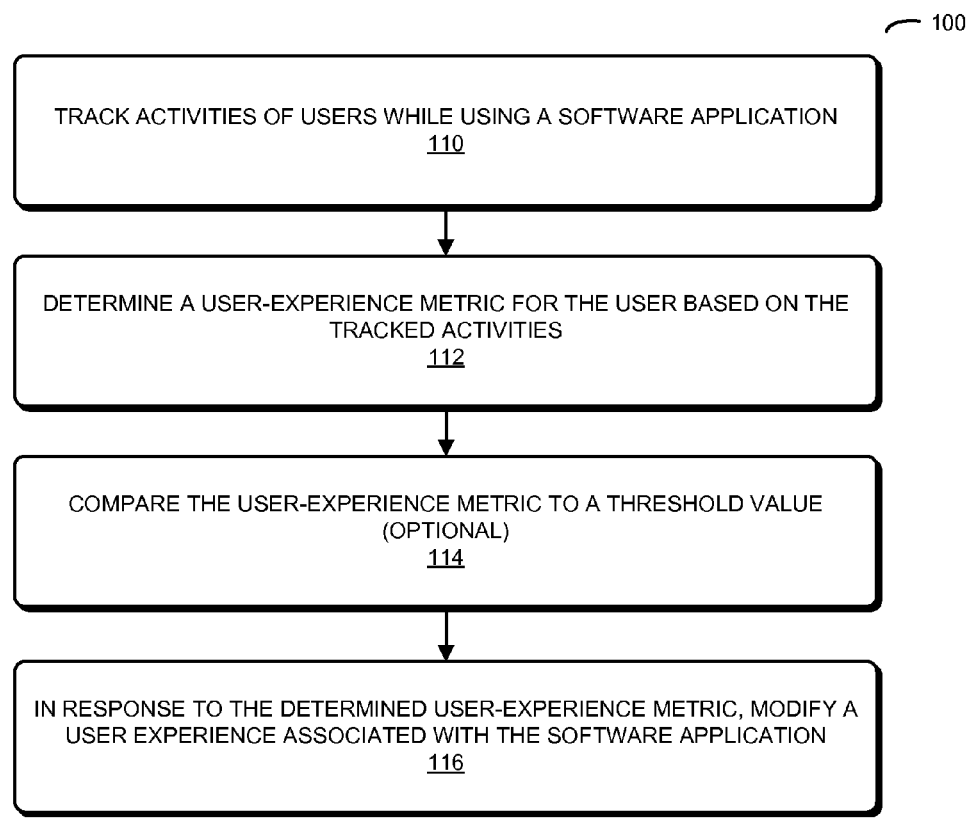
FIG. 1 is a flow chart illustrating a method for modifying a user experience associated with a software application in accordance with an embodiment of the present disclosure.

We now describe embodiments of the modification technique. FIG. 1 presents a flow chart illustrating a method 100 for modifying a user experience associated with a software application, which may be performed by a computer system (such as computer systems 400 in FIG. 4 and/or 500 in FIG. 5). During operation, the computer system tracks activities of a user while using the software application (operation 110). For example, the tracked activities may include: user-interface operations performed by the user in a given portion of the software application (such as a page or screen in the software application); switching between portions of the software application (such as switching between pages); and/or monitoring information provided by the user to an online forum associated with the software application (such as a real-time chat room or blog). In the latter example, the computer system may extract content from the monitored information, for example, using a natural-language-processing technique.

Then, the computer system determines a user-experience metric for the user based on the tracked activities (operation 112), where the user-experience metric reflects a need to modify the user experience associated with the software application. (Note that the determined user-experience metric may provide a forecast of pending customer-support demand which, as described below, can be used to modify a user experience associated with the software application, thereby reducing future demand for customer support.)

Determining the user-experience metric may involve calculating a uniqueness metric for user-interface operations and a relative time spent per portion of the software application, where the support confidence metric corresponds to the uniqueness metric for user-interface operations and the relative time spent per portion of the software application. For example, the support confidence metric may be a function of the uniqueness metric for user-interface operations and the relative time spent per portion of the software application (such as a linear superposition, with corresponding weights, of the uniqueness metric for user-interface operations and the relative time spent per portion of the software application). However, a wide variety of functions, including linear and nonlinear functions, may be used. Furthermore, the confidence metric may further correspond to an estimated emotional state of the user (for example, an estimate of user frustration or happiness, which may be determined based on the tracked activities, such as: a question or reply received from a user, a click on a post by a user, and/or a search performed by a user). These estimated emotional states may be positive and/or negative.

In some embodiments, the uniqueness metric for user-interface operations has a different value (such as a larger value) for user-interface operations performed in a portion of the software application that was not previously viewed during a user session. Moreover, the relative time spent per portion of the software application may have a different value (such as a larger value) if a time spent by the user in a portion of the software application equals an average time spent per portion of the software application.

In response to the determined user-experience metric, the computer system modifies the user experience (operation 116). For example, the modification may include: providing help content to the user (which may be presented in a pop-up or an embedded window), changing a user interface associated with the software application (which may make the software application easier to use), and/or contacting the user (such as by telephoning the user or via a chat session). Note that modifying the user experience may reduce the probability that the user will contact customer support associated with the software application.

In some embodiments, prior to modifying the user experience, the computer system optionally compares the user-experience metric to a threshold value (operation 114). This threshold value may be dynamically changed based at least on a time of year or available resources. Thus, at times of the year when there is high demand for customer support (such as just before April $15^{th}$ for income-tax preparation software), the threshold value may be low (i.e., it may be more likely that the user experience is modified). Similarly, if available customer-support resources (such as customer-support representatives) are currently unused, the threshold value may be high (i.e., it may be less likely that the user experience is modified).

In an exemplary embodiment, the modification technique is implemented using one or more electronic devices and at least one server computer, which communicate through a network, such as a cellular-telephone network and/or the Internet (e.g., using a client-server architecture). This is illustrated for one user in FIG. 2, which presents a flow chart illustrating method 100. During this method, a user of computer 210 may use a software application (operation 214). The activities of the user may be provided by computer 210 (operation 216) to server 212, which tracks the activities of the user (operation 218).

Then, server 212 determines the user-experience metric for the user based on the tracked activities (operation 220). In some embodiments, server 212 optionally compares the user-experience metric to a threshold value (operation 222) to determine if the user experience should be modified.

In response to the determined user-experience metric, server 212 may modify the user experience (operation 224), such as by: providing help content to the user, providing instructions that change a user interface associated with the software application, and/or contacting the user. This modification to the user experience may be received by computer 210 (operation 226) and optionally implemented (operation 228), thereby helping the user in using the software application (and, among other things, reducing a likelihood that the user will contact customer support).

In some embodiments of method 100 (FIGS. 1 and 2), there may be additional or fewer operations. For example, while the preceding discussion illustrates the modification technique in the context of a single user, in some embodiments the metrics are averaged over multiple users who are interacting or who have recently interacted with the software application at a given time (such as within the last hour, day and/or week). Moreover, the order of the operations may be changed, and/or two or more operations may be combined into a single operation.

In an exemplary embodiment of method 100, the modification technique is used to track, in real time, and determine several metrics that indicate future assisted-support or call-center load (e.g., an 'intent to call'). In particular, during the modification technique some or all of the user's actions or activities when using the software application may be tracked. For example, clicks or user-interface operations performed by the user may be tracked. Furthermore, when the user goes from one screen or page to another (such as when the user activates 'continue' or 'back' icons), as well as how long the user remains on a given screen or page (i.e., the view time), may be tracked. If the user is confident when using the software application, the user may quickly move from screen to screen. However, if the user is uncertain, the user may move back and forth between screens multiple times, the user may view a given screen for a long time and/or, in general, the user's use behavior may be erratic.

Consequently, one of the metrics may assess the uniqueness of the user's click patterns (i.e., the uniqueness metric for user-interface operations). For example, viewing a new page or screen may be scored as a '1,' while viewing the same page or screen may be scored as a '0.'

Another of the metrics may assess the time spent per page relative to the average time spent per page (i.e., the relative time spent per portion of the software application). If the user spends the average time on a given screen, this metric may increase in value; otherwise, this metric may decrease in value.

The user-experience metric for the user may be determined by combining the metrics. As noted previously, this mapping may involve a wide variety of functions and techniques, including: linear functions, nonlinear functions, a decision tree, or another supervised learning technique. Moreover, the decision whether to modify the user experience may be based on the user-experience metric for the user. In some embodiments, the user-experience metric is compared to a threshold, and this threshold may be dynamic.

In some embodiments, the tracking of user activities and determining of the metrics can be facilitated by real-time monitoring of user click streams and text data, as well as real-time text analytics (such as posts, replies and feedback), when the user participates in an online forum that is associated with a software application. (In general, the tracking may be performed via the online form and/or by the software application.) For example, one or more widgets may be placed on the user's computer when the user interacts with the online form (so-called 'passive' monitoring) and/or when the user provides text data (so-called 'active' monitoring). Moreover, the real-time metrics may include one or more answer rates and response times to postings by the user (or, possibly, other users) in the online forum (e.g., one or more answer rates achieved in one hour or one day). These real-time metrics may be classified per question type (e.g., income-tax and product-related questions in the online forum). Note that the online forum may include a so-called 'Live Community Platform,' a social network for customer support which allows software developers to ask questions and answer user questions associated with a software application or product.

In some embodiments, the tracked metrics includes unusual activities in the online forum, such as spikes in keywords frequencies related to software bugs, system failures, etc., which may indicate an increasing demand for customer support.

Furthermore, in some embodiments the modification technique may be facilitated by allowing the user to use a demonstration of the software application in the online form (a so-called 'try before you buy' feature). (Alternatively, the user may first buy the software application before trying or using it.) In these embodiments, a subset of the users of the software application may be tracked (such as 5, 10 or 25% of the users). However, this subset may be sufficient to forecast demand for customer support, as well as the types of problems that customers may have. Note that because of these features, and the ability to make real-time predictions, the modification technique may address the challenges posed in forecasting demand for software applications that have extreme seasonal usage variations, such as income-tax preparation software.

Figure 3:
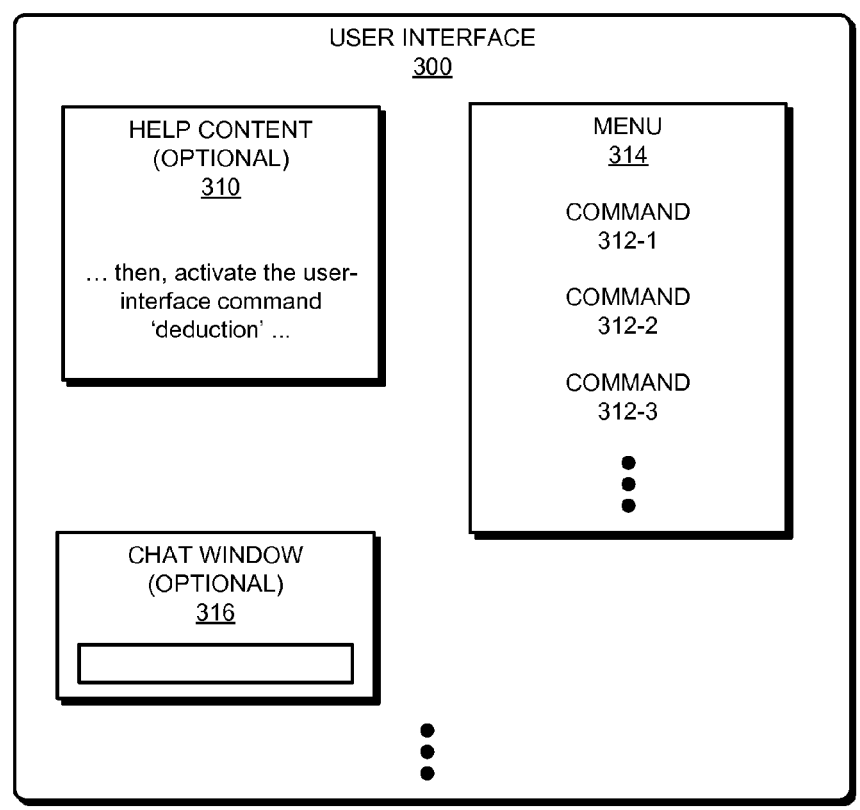
FIG. 3 is a block diagram illustrating a user interface in accordance with an embodiment of the present disclosure.

FIG. 3 presents a block diagram illustrating a user interface 300. This user interface (and the associated user experience) may be modified based on the determined user-experience metric. For example, optional help content 310 may be displayed. Alternatively or additionally, commands 312 in menu 314 may be changed or rearranged. Thus, if the user is confused, command 312-1 may be moved to the top of menu 314 and help content 310 may instruct the user that this command can be activated to solve the user's current problem. More generally, changing the user experience may involve changing user-interface operations, such as: shortcuts, hot keys, an arrangement of icons on a virtual keyboard, etc. In some embodiments, modifying the user experience involves contacting the user, such as via optional chat window 316.

Figure 2:
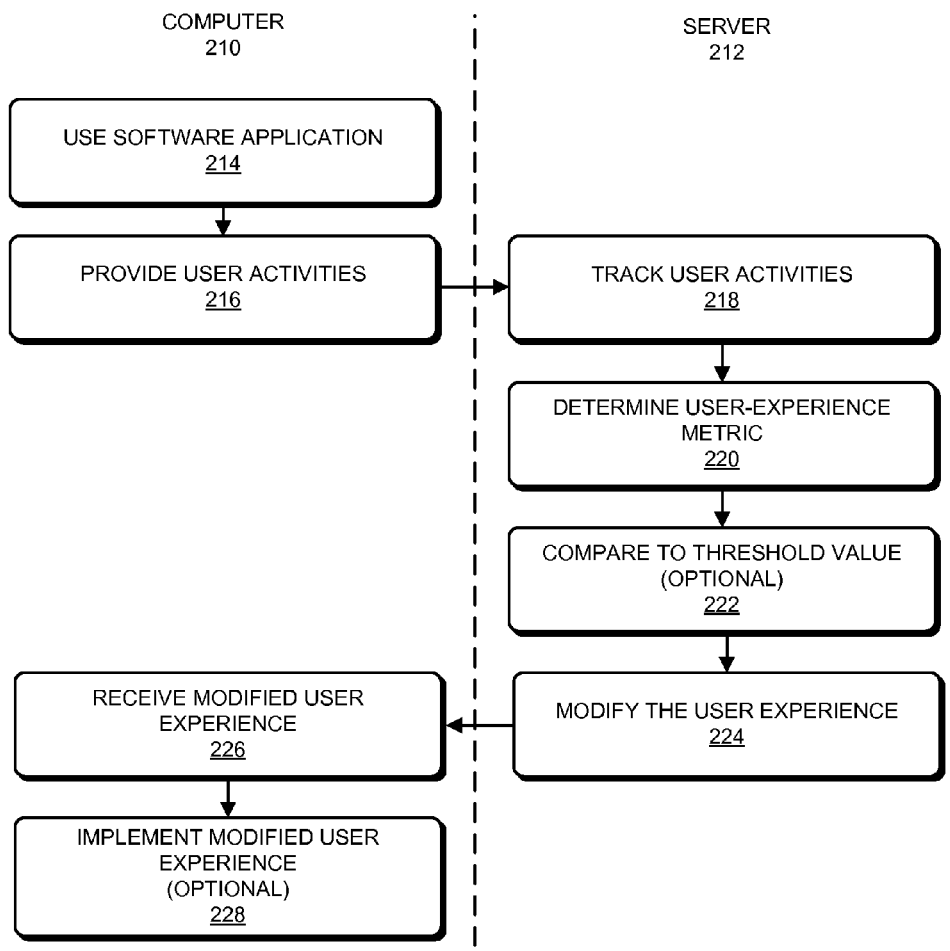
FIG. 2 is a flow chart illustrating the method of FIG. 1 in accordance with an embodiment of the present disclosure.
Figure 4:
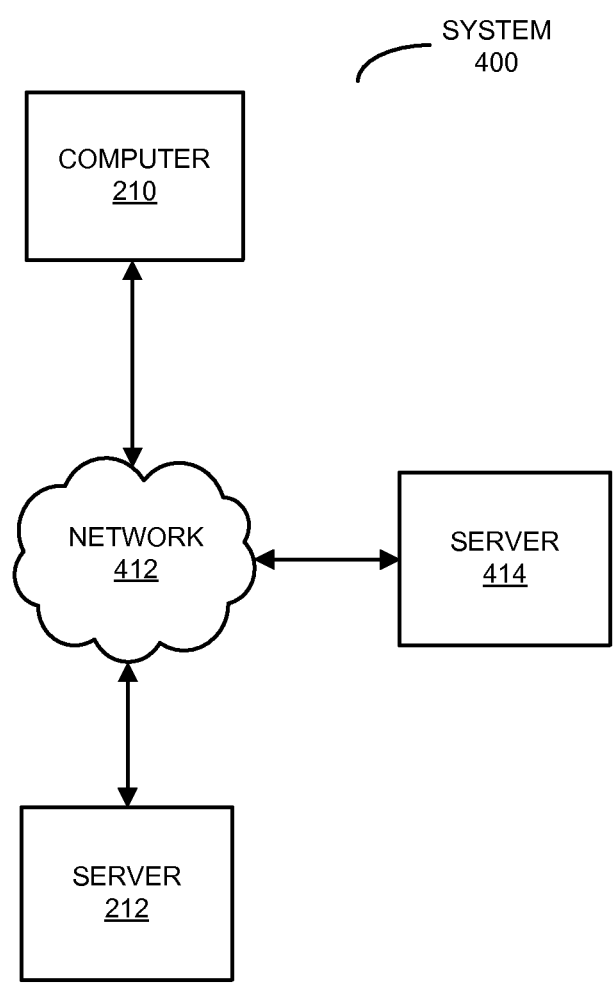
FIG. 4 is a block diagram illustrating a computer system that performs the method of FIGS. 1 and 2 in accordance with an embodiment of the present disclosure.

We now describe embodiments of the computer system and its use. FIG. 4 presents a block diagram illustrating a computer system 400 that performs method 100 (FIGS. 1 and 2). In this system, a user of computer 210 may use a software product or application, such as a financial application (which is used as an illustrative example). For example, the user may interact with a web page that is provided by server 414 via network 412, and which is rendered by a web browser on computer 210. Alternatively, the user may use a financial application that is resident on and that executes on computer 210. This financial application may be a standalone application or a portion of another application that is resident on and which executes on computer 210 (such as financial application that is provided by server 414 or that is installed and which executes on computer 210). Consequently, in some embodiments the financial application may operate independently of coupling to network 412.

In some embodiments, at least a portion of the financial application may be an application tool (such as a financial application tool) that is embedded in the web page (and which executes in a virtual environment of the web browser). Thus, the financial application tool may be provided to the user via a client-server architecture.

As discussed previously, while using the financial application on computer 210, the activities of the user may be tracked by server 212. In particular, the financial application may monitor the user's activities (such as a click stream, entered text data, user-interface commands or operations, participation in an online forum, etc.), and may report the monitored activities to server 212 via network 412.

Then, server 212 determines the user-experience metric for the user based on the tracked activities. In some embodiments, server 212 optionally compares the user-experience metric to a threshold value. Either alone or in conjunction with the user-experience metrics of other users, server 212 can determine if the user experience associated with the financial application should be modified for the user (or, possibly, multiple users).

In response to the determined user-experience metric of at least the user, server 212 may modify the user experience. For example, server 212 may send instructions to computer 210 via network 412 to: display help content in the financial application (such as context-dependent help content based on a recent user-interface or operation history of the user), change the user interface associated with the financial application, and/or contact the user.

Note that information in computer system 400 may be stored at one or more locations in computer system 400 (i.e., locally or remotely). Moreover, because this data may be sensitive in nature, it may be encrypted. For example, stored data and/or data communicated via network 412 may be encrypted.

Figure 5:
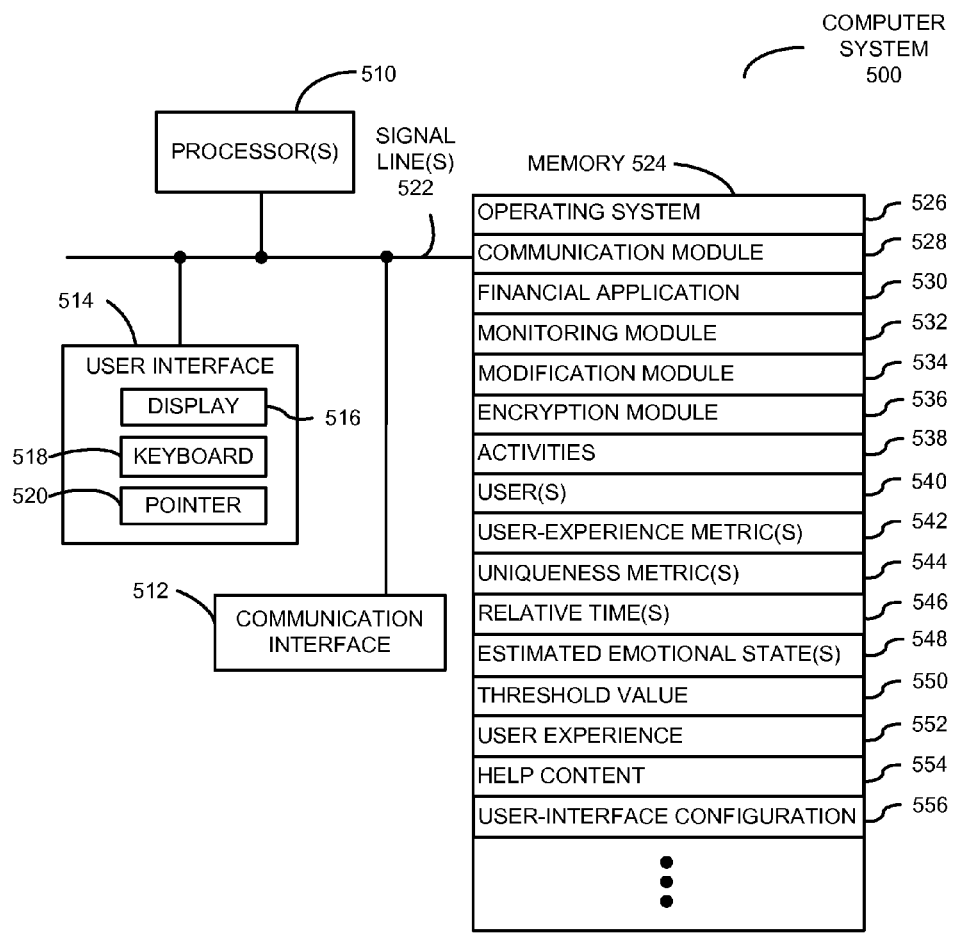
FIG. 5 is a block diagram illustrating a computer system that performs the method of FIGS. 1 and 2 in accordance with an embodiment of the present disclosure.

FIG. 5 presents a block diagram illustrating a computer system 500 that performs method 100 (FIGS. 1 and 2), such as computer 210 or server 212 (FIGS. 2 and 4). Computer system 500 includes one or more processing units or processors 510, a communication interface 512, a user interface 514, and one or more signal lines 522 coupling these components together. Note that the one or more processors 510 may support parallel processing and/or multi-threaded operation, the communication interface 512 may have a persistent communication connection, and the one or more signal lines 522 may constitute a communication bus. Moreover, the user interface 514 may include: a display 516, a keyboard 518, and/or a pointer 520, such as a mouse.

Memory 524 in computer system 500 may include volatile memory and/or non-volatile memory. More specifically, memory 524 may include: ROM, RAM, EPROM, EEPROM, flash memory, one or more smart cards, one or more magnetic disc storage devices, and/or one or more optical storage devices. Memory 524 may store an operating system 526 that includes procedures (or a set of instructions) for handling various basic system services for performing hardware-dependent tasks. Memory 524 may also store procedures (or a set of instructions) in a communication module 528. These communication procedures may be used for communicating with one or more computers and/or servers, including computers and/or servers that are remotely located with respect to computer system 500.

Memory 524 may also include multiple program modules (or sets of instructions), including: financial application 530 (or a set of instructions), monitoring module 532 (or a set of instructions), modification module 534 (or a set of instructions) and/or encryption module 536 (or a set of instructions). Note that one or more of these program modules (or sets of instructions) may constitute a computer-program mechanism.

Figure 6:
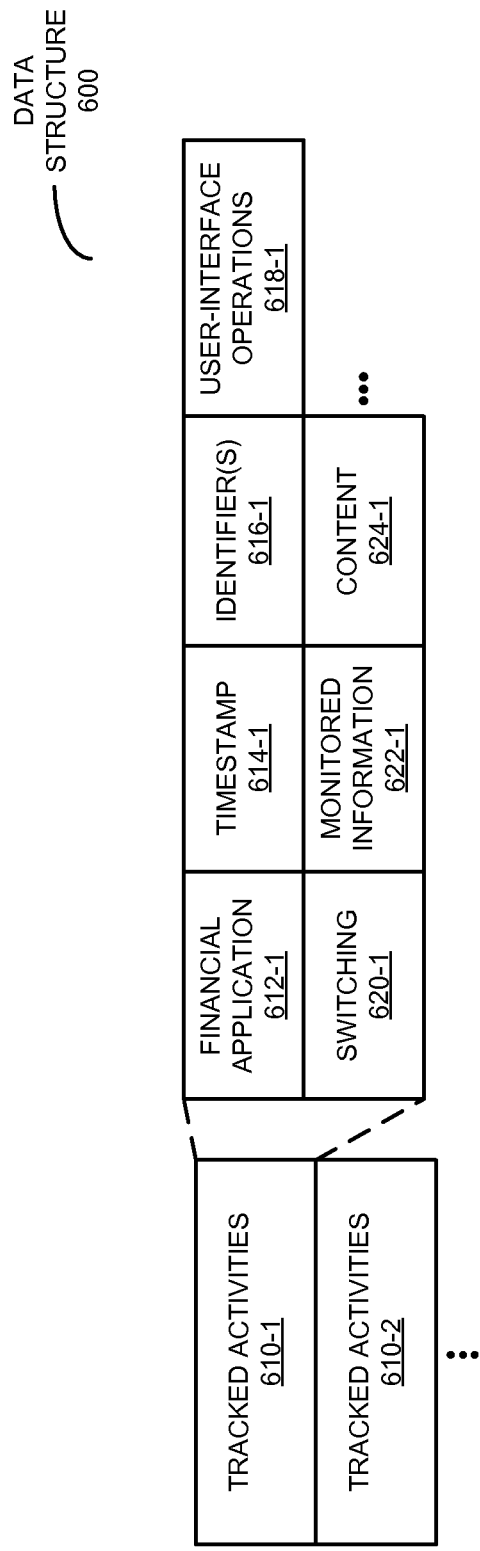
FIG. 6 is a block diagram illustrating a data structure for use in the computer system of FIG. 5 in accordance with an embodiment of the present disclosure.

During method 100 (FIGS. 1 and 2), monitoring module 532 tracks activities 538 of one or more users 540 while the one or more users 540 use financial application 530. FIG. 6 illustrates a data structure 600, which may include tracked activities 538 (FIG. 5). In particular, data structure 600 may include tracked activities 610. For example, tracked activities 610-1 may include: a financial application 612-1, a timestamp 614-1, one or more user identifiers 616-1, user-interface operations 618-1 performed by the one or more users in a given portion of the financial application, switching 620-1 between portions of the financial application, monitored information 622-1 provided by the one or more users to an online forum associated with the financial application, and/or content 624-1 extracted from monitored information 622-1.

Referring back to FIG. 5, then modification module 534 determines one or more user-experience metrics 542 for the one or more users 540 based on tracked activities 538. For example, when determining the one or more user-experience metrics 542, modification module 534 may calculate one or more uniqueness metrics 544 for user-interface operations, one or more relative times 546 spent per portions of the software application, and/or one or more estimated emotional states 548 of the one or more users 540.

In some embodiments, modification module 534 compares the one or more user-experience metrics 542 to a threshold value 550 to determine if user experience 552 of at least one of the users 540 should be modified.

In response to the one or more determined user-experience metrics 542, modification module 534 may modify user experience 552. For example, modification module 534 may send instructions to financial application 530 to: display help content 554 and/or modify a user-interface configuration 556. Alternatively or additionally, modification module 534 or a customer-support representative may contact at least one of users 540.

Because information in computer system 500 may be sensitive in nature, in some embodiments at least some of the data stored in memory 524 and/or at least some of the data communicated using communication module 528 is encrypted using encryption module 536. Additionally, in some embodiments one or more of the modules in memory 524 may be included in financial application 530.

Instructions in the various modules in memory 524 may be implemented in: a high-level procedural language, an object-oriented programming language, and/or in an assembly or machine language. Note that the programming language may be compiled or interpreted, e.g., configurable or configured, to be executed by the one or more processors 510.

Although computer system 500 is illustrated as having a number of discrete items, FIG. 5 is intended to be a functional description of the various features that may be present in computer system 500 rather than a structural schematic of the embodiments described herein. In practice, and as recognized by those of ordinary skill in the art, the functions of computer system 500 may be distributed over a large number of servers or computers, with various groups of the servers or computers performing particular subsets of the functions. In some embodiments, some or all of the functionality of computer system 500 may be implemented in one or more application-specific integrated circuits (ASICs) and/or one or more digital signal processors (DSPs).

Electronic devices, computers and servers in computer systems 400 (FIG. 4) and/or 500 may include one of a variety of devices capable of manipulating computer-readable data or communicating such data between two or more computing systems over a network, including: a personal computer, a laptop computer, a tablet computer, a mainframe computer, a portable electronic device (such as a cellular phone or PDA), a server and/or a client computer (in a client-server architecture). Moreover, network 412 (FIG. 4) may include: the Internet, World Wide Web (WWW), an intranet, a cellular-telephone network, LAN, WAN, MAN, or a combination of networks, or other technology enabling communication between computing systems.

In exemplary embodiments, financial application 530 includes: Quicken™ and/or TurboTax™ (from Intuit, Inc., of Mountain View, Calif.); Microsoft Money™ (from Microsoft Corporation, of Redmond, Wash.); SplashMoney™ (from SplashData, Inc., of Los Gatos, Calif.); Mvelopes™ (from In2M, Inc., of Draper, Utah); open-source applications such as Gnucash™, PLCash™, and/or Budget™ (from Snowmint Creative Solutions, LLC, of St. Paul, Minn.); and/or other planning software capable of processing financial information.

Moreover, financial application 530 may include software such as: QuickBooks™ (from Intuit, Inc., of Mountain View, Calif.); Peachtree™ (from The Sage Group PLC, of Newcastle Upon Tyne, the United Kingdom); Peachtree Complete™ (from The Sage Group PLC, of Newcastle Upon Tyne, the United Kingdom); MYOB Business Essentials™ (from MYOB US, Inc., of Rockaway, N.J.); NetSuite Small Business Accounting™ (from NetSuite, Inc., of San Mateo, Calif.); Cougar Mountain™ (from Cougar Mountain Software, of Boise, Id.); Microsoft Office Accounting™ (from Microsoft Corporation, of Redmond, Wash.); Simply Accounting™ (from The Sage Group PLC, of Newcastle Upon Tyne, the United Kingdom); CYMA IV Accounting™ (from CYMA Systems, Inc., of Tempe, Ariz.); DacEasy™ (from Sage Software SB, Inc., of Lawrenceville, Ga.); Microsoft Money™ (from Microsoft Corporation, of Redmond, Wash.); Tally.ERP (from Tally Solutions, Ltd., of Bangalore, India); and/or other payroll or accounting software capable of processing payroll information.

User interface 300 (FIG. 3), computer system 400 (FIG. 4), computer system 500 (FIG. 5) and/or data structure 600 may include fewer components or additional components. Moreover, two or more components may be combined into a single component, and/or a position of one or more components may be changed. In some embodiments, the functionality of computer system 400 (FIG. 4) and/or computer system 500 may be implemented more in hardware and less in software, or less in hardware and more in software, as is known in the art.

While the preceding embodiments illustrated changing the user experience in the modification technique dynamically or in near real time, in other embodiments the user experience for one or more users may occur at the next software update or software release (i.e., on a longer time scale).

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer-implemented method for modifying a user experience associated with a software application, comprising:
    tracking activities of a user while using the software application wherein the tracked activities comprise the user's interactions with the software application's user-interface;
    determining a user-experience metric for the user by:
        calculating a first component based on a uniqueness of a pattern of the user's interactions, wherein the uniqueness has a larger value for user-interface operations performed in a portion of the software application that was not previously viewed during a user session;
        calculating a second component based on whether the time spent by the user on a given screen is less than an average time spent by the user for each screen in the application;
        calculating a third component based on the user's estimated emotional state; and
        combining the first, second, and third components in a linear function, a non-linear function, or a decision tree to obtain the user experience metric; and
    upon determining that the user-experience metric exceeds a threshold value, modifying the user experience.

2. The method of claim 1, wherein the tracked activities include user-interface operations performed by the user in a given portion of the software application.

3. The method of claim 1, wherein the tracked activities include switching between portions of the software application.

4. The method of claim 1, wherein the tracked activities include monitoring information provided by the user to an online forum associated with the software application.

5. The method of claim 4, wherein the method further involves extracting content from the monitored information.

6. The method of claim 1, wherein the uniqueness metric has a different value for user-interface operations performed in a portion of the software application that was not previously viewed during a user session.

7. The method of claim 1, wherein the relative time spent has a different value if a time spent by the user in a portion of the software application equals an average time spent per portion of the software application.

8. The method of claim 1, wherein the user-experience metric further corresponds to an estimated emotional state of the user.

9. The method of claim 1, wherein, prior to modifying the user experience, the method further comprises comparing the user-experience metric to a threshold value.

10. The method of claim 1, wherein the modification to the user experience reduces the probability that the user will contact customer support associated with the software application.

11. The method of claim 1, wherein the modification includes at least one of: providing help content to the user, changing a user interface associated with the software application, and contacting the user.

12. A non-transitory computer-program product for use in conjunction with a computer system to modify a user experience associated with a software application, the computer-program product comprising a computer-readable storage medium and a computer-program mechanism embedded therein, the computer-program mechanism including:
    instructions for tracking activities of a user while using the software application wherein the tracked activities comprise the user's interactions with the software application's user-interface;
    instructions for determining a user-experience metric for the user by:
        calculating a first component based on a uniqueness of a pattern of the user's interactions, wherein the uniqueness has a larger value for user-interface operations performed in a portion of the software application that was not previously viewed during a user session;
        calculating a second component based on whether the time spent by the user on a given screen is less than an average time spent by the user for each screen in the application;
        calculating a third component based on the user's estimated emotional state; and combining the first, second, and third components in a linear function, a non-linear function, or a decision tree to obtain the user experience metric;

instructions for modifying the user experience upon determining that the user-experience metric exceeds a threshold value.

13. The non-transitory computer-program product of claim 12, wherein the tracked activities include user-interface operations performed by the user in a given portion of the software application.

14. The non-transitory computer-program product of claim 12, wherein the tracked activities include switching between portions of the software application.

15. The non-transitory computer-program product of claim 12, wherein the tracked activities include monitoring information provided by the user to an online forum associated with the software application.

16. The non-transitory computer-program product of claim 15, wherein the computer-program mechanism further includes instructions for extracting content from the monitored information.

17. The non-transitory computer-program product of claim 12, wherein, prior to modifying the user experience, the computer-program mechanism further includes instructions for comparing the user-experience metric to a threshold value.

18. The non-transitory computer-program product of claim 12, wherein the modification includes at least one of: providing help content to the user, changing a user interface associated with the software application, and contacting the user.

19. A computer system, comprising:
a processor;
memory; and
a program module, wherein the program module is stored in the memory and configurable to be executed by the processor to modify a user experience associated with a software application, the program module including:
instructions for tracking activities of a user while using the software application wherein the tracked activities comprise the user's interactions with the software application's user-interface;
instructions for determining a user-experience metric for the user by:
calculating a first component based on a uniqueness of a pattern of the user's interactions, wherein the uniqueness has a larger value for user-interface operations performed in a portion of the software application that was not previously viewed during a user session;
calculating a second component based on whether the time by the user spent on a given screen is less than an average time spent by the user for each screen in the application;
calculating a third component based on the user's estimated emotional state; and
combining the first, second, and third components in a linear function, a non-linear function, or a decision tree to obtain the user experience metric, and
instructions for modifying the user experience upon determining that the user-experience metric exceeds a threshold value.

* * * * *